(12) United States Patent
Bolay et al.

(10) Patent No.: US 8,990,366 B2
(45) Date of Patent: Mar. 24, 2015

(54) METHOD AND APPARATUS FOR REMOTE MODIFICATION OF SYSTEM CONFIGURATION

(75) Inventors: Frederick H. Bolay, Rancho Cordova, CA (US); Rajeev K. Nalawadi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 12/965,246

(22) Filed: Dec. 10, 2010

(65) Prior Publication Data

US 2012/0151020 A1 Jun. 14, 2012

Related U.S. Application Data

(60) Continuation of application No. 12/779,868, filed on May 13, 2010, now Pat. No. 8,122,112, which is a continuation of application No. 12/038,584, filed on Feb. 27, 2008, now Pat. No. 7,769,836, which is a division of application No. 10/747,319, filed on Dec. 23, 2003, now Pat. No. 7,373,498.

(51) Int. Cl.
*G06F 15/177* (2006.01)
*G06F 9/445* (2006.01)
*G06F 15/16* (2006.01)
*G06F 9/00* (2006.01)
*H04M 3/00* (2006.01)

(52) U.S. Cl.
CPC ....................... *G06F 8/65* (2013.01)
USPC ........... 709/221; 709/220; 709/227; 713/100; 455/418

(58) Field of Classification Search
USPC ............ 709/221, 227, 220; 713/100; 455/418
See application file for complete search history.

(56) References Cited

U.S. PATENT DOCUMENTS

| | | | |
|---|---|---|---|
| 5,388,267 A | 2/1995 | Chan et al. | |
| 5,579,522 A | 11/1996 | Christeson et al. | |
| 5,634,075 A | 5/1997 | Smith et al. | |
| 5,761,448 A | 6/1998 | Adamson et al. | |
| 5,805,833 A | 9/1998 | Verdun | |
| 5,822,581 A | 10/1998 | Christeson | |

(Continued)

FOREIGN PATENT DOCUMENTS

| | | |
|---|---|---|
| EP | 0803812 A | 10/1997 |
| EP | 1003099 A2 | 5/2000 |
| WO | 2005/064460 A1 | 7/2005 |

OTHER PUBLICATIONS

Office Action for U.S. Appl. No. 12/965,446, mailed Dec. 10, 2010, 8 pages.

(Continued)

*Primary Examiner* — David Lazaro
*Assistant Examiner* — Vitali Korobov
(74) *Attorney, Agent, or Firm* — Schwabe, Williamson & Wyatt, P.C.

(57) ABSTRACT

A method and apparatus for updating the system configuration settings of a computer system Embodiments include a remote system configuration system that enables a user to update the system configuration of a target machine from a server machine over a network or similar communications system. Another embodiment includes a system configuration method using a bus master device to write system configuration data into a target computer system.

15 Claims, 4 Drawing Sheets

(56) References Cited

U.S. PATENT DOCUMENTS

| | | | |
|---|---|---|---|
| 5,835,761 | A | 11/1998 | Ishii et al. |
| 5,835,960 | A | 11/1998 | Keene et al. |
| 5,842,027 | A | 11/1998 | Oprescu et al. |
| 5,864,698 | A | 1/1999 | Krau et al. |
| 5,954,808 | A | 9/1999 | Paul |
| 5,987,605 | A | 11/1999 | Hill et al. |
| 5,991,875 | A | 11/1999 | Paul |
| 6,085,318 | A | 7/2000 | Vander Kamp et al. |
| 6,148,354 | A | 11/2000 | Ban et al. |
| 6,148,355 | A | 11/2000 | Mahalingam |
| 6,185,678 | B1 * | 2/2001 | Arbaugh et al. ............ 713/2 |
| 6,212,585 | B1 | 4/2001 | Chrabaszcz |
| 6,263,387 | B1 | 7/2001 | Chrabaszcz |
| 6,282,647 | B1 | 8/2001 | Leung et al. |
| 6,401,198 | B1 | 6/2002 | Harmer et al. |
| 6,401,239 | B1 | 6/2002 | Miron |
| 6,434,696 | B1 | 8/2002 | Kang |
| 6,438,688 | B1 | 8/2002 | Nunn |
| 6,535,976 | B1 | 3/2003 | Hoggarth et al. |
| 6,594,757 | B1 | 7/2003 | Martinez |
| 6,658,562 | B1 | 12/2003 | Bonomo et al. |
| 6,671,802 | B1 | 12/2003 | Ott |
| 6,732,267 | B1 | 5/2004 | Wu et al. |
| 6,754,811 | B1 | 6/2004 | Cato et al. |
| 6,763,399 | B2 | 7/2004 | Margalit et al. |
| 6,976,058 | B1 | 12/2005 | Brown et al. |
| 6,976,163 | B1 | 12/2005 | Hind et al. |
| 7,000,101 | B2 | 2/2006 | Wu et al. |
| 7,024,471 | B2 | 4/2006 | George et al. |
| 7,051,327 | B1 | 5/2006 | Milius et al. |
| 7,069,452 | B1 | 6/2006 | Hind et al. |
| 7,209,804 | B2 | 4/2007 | Curt et al. |
| 7,373,498 | B2 | 5/2008 | Bolay et al. |
| 7,430,602 | B2 * | 9/2008 | Babbar et al. ............ 709/227 |
| 7,483,965 | B1 * | 1/2009 | Gerraty ............ 709/221 |
| 7,519,690 | B1 * | 4/2009 | Barrow et al. ............ 709/220 |
| 7,558,835 | B1 * | 7/2009 | Shafer ............ 709/213 |
| 7,769,836 | B2 | 8/2010 | Bolay et al. |
| 7,840,652 | B2 | 11/2010 | Schran et al. |
| 8,010,997 | B2 | 8/2011 | Limont et al. |
| 2002/0069353 | A1 | 6/2002 | Smith |
| 2002/0099934 | A1 | 7/2002 | Cromer et al. |
| 2003/0143989 | A1 * | 7/2003 | Ho et al. ............ 455/418 |
| 2003/0177345 | A1 | 9/2003 | Huang |
| 2004/0030880 | A1 * | 2/2004 | Kitagawa ............ 713/1 |
| 2004/0139308 | A1 | 7/2004 | Foster et al. |
| 2005/0055575 | A1 * | 3/2005 | Evans et al. ............ 713/201 |
| 2005/0130708 | A1 * | 6/2005 | Duncan Ho et al. ............ 455/561 |
| 2006/0168160 | A1 | 7/2006 | Pratt |
| 2007/0275701 | A1 * | 11/2007 | Jonker ............ 455/414.1 |
| 2008/0025278 | A1 * | 1/2008 | Hoecker et al. ............ 370/338 |
| 2008/0057877 | A1 * | 3/2008 | Pinder ............ 455/75 |
| 2008/0301666 | A1 * | 12/2008 | Gordon et al. ............ 717/172 |
| 2009/0156197 | A1 * | 6/2009 | Ho et al. ............ 455/423 |
| 2010/0087179 | A1 * | 4/2010 | Makavy et al. ............ 455/418 |
| 2010/0248707 | A1 | 9/2010 | Hoffner et al. |
| 2011/0320614 | A1 * | 12/2011 | Makavy et al. ............ 709/227 |

OTHER PUBLICATIONS

Office Action for U.S. Appl. No. 10/747,319, mailed Apr. 21, 2006, 10 pages.

Office Action for U.S. Appl. No. 10/747,319, mailed Jan. 12, 2007, 11 pages.

Office Action for U.S. Appl. No. 10/747,319, mailed Jun. 11, 2007, 16 pages.

Office Action for U.S. Appl. No. 10/747,319, mailed Nov. 19, 2007, 9 pages.

Tanebaum, Andrew S., Structured Computer Organization, Prentice-Hall, 2nd Ed., 1984, pp. 10-12.

Extended European Search Report for EP 10012450.2, mailed Aug. 2, 2011, 12 pages.

International Business Machines Corporation, "System Firmware Update Method Before Rebooting the Operating System," Research Disclosure, Mason Publications, Hampshire, GB, vol. 425, Issue No. 86, Sep. 1, 1999.

Office Action for U.S. Appl. No. 12/965,446, mailed Jul. 2, 2013, 7 pages.

Office Action, issued in U.S. Appl. No. 12/965,446, mailed Jan. 14, 2014, 8 pages.

* cited by examiner

METHOD AND APPARATUS FOR REMOTE MODIFICATION OF SYSTEM CONFIGURATION

CROSS-REFERENCE TO RELATED APPLICATIONS

This application is a Continuation of U.S. patent application Ser. No. 12/779,868, filed on May 13, 2010, now U.S. Pat. No. 8,122,112, entitled "Method and apparatus for removable device modification of system configuration", which is a Continuation of U.S. patent application Ser. No. 12/038,584, filed on Feb. 27, 2008, now U.S. Pat. No. 7,769,836, entitled "Method and Apparatus for Removable Device Modification of System Configuration", which is a Divisional of U.S. patent application Ser. No. 10/747,319, filed on Dec. 23, 2003, now U.S. Pat. No. 7,373,498, entitled "Method and Apparatus for Remote Modification of System Configuration".

BACKGROUND

1. Field

Embodiments of the invention relate to computer system configurations. Specifically, embodiments relate to remotely changing the system configuration and updating the system configuration utilizing a bus master device.

2. Background

A computer system includes multiple devices that are necessary for its functioning. These devices must each be started or initialized when the system is powered on or restarted. Most computer systems include a system configuration manager program that handles the basic start up and initialization of the computer system.

In some computer systems the basic start up and initialization program or system configuration manager is referred to as the basic input-output system (BIOS). The computer system after power up or restart begins by executing the first instruction of the BIOS. The BIOS initializes the chipset, tests and initializes system memory, and tests and initializes peripheral device functionality. This process is collectively known as Power-on Self Test (POST). After system devices have been properly initialized the BIOS loads a boot-loader program. The boot-loader program is stored in the designated boot sector of a storage device such as a fixed disk. The boot-loader starts the operating system. The operating system then takes control of the computer system.

BIOS code is firmware that is stored in a flash memory device. The BIOS code uses configuration data to program user configurable settings during system POST. BIOS configuration data is stored in a nonvolatile memory that is composed of complementary metal oxide semiconductors (CMOS). CMOS is an energy efficient technology allowing it to be supported by a back up battery when a computer system is disconnected from its main power source. Non-volatile data used during POST includes real time clock (RTC) date and time data, drive configurations, system memory settings, operating system settings, serial and parallel port settings and other system settings.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
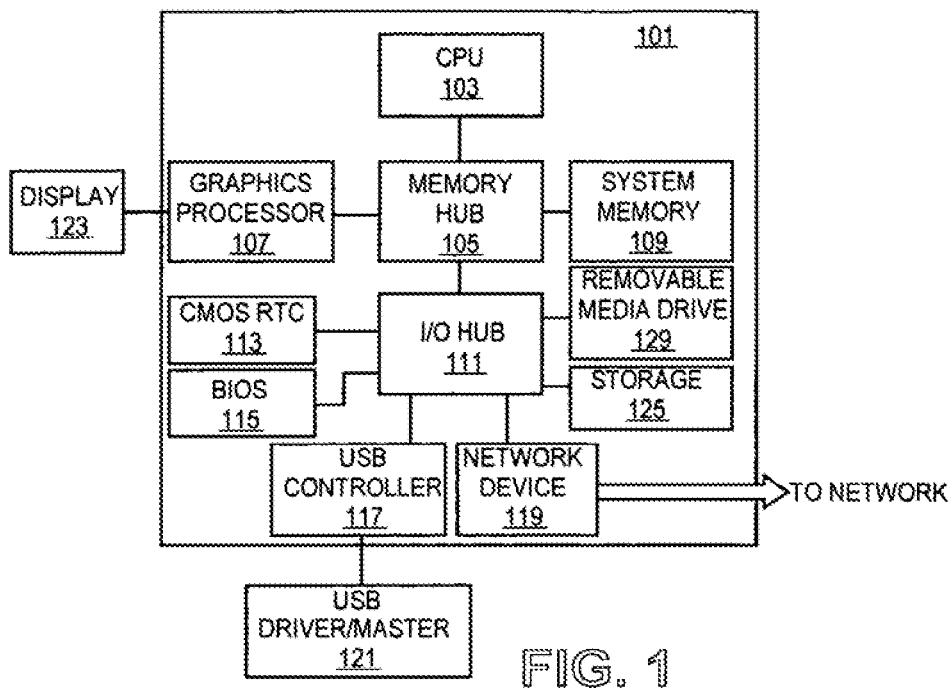
FIG. 1 is a diagram of one embodiment of a computer system.

FIG. 1 is a diagram of one embodiment of a computer system. In one embodiment, computer system 101 may include a central processing unit (CPU) 103 to execute instructions. In another embodiment, computer system 101 may include multiple processors. CPU 103 may be located on a mainboard. In an embodiment with multiple processors, each processor may be located on or attached to the same mainboard or on separate mainboards. CPU 103 may be in communication with a memory hub 105 or similar device.

In one embodiment, memory hub 105 provides a communication link between CPU 103 and system memory 109, input-output (I/O) hub 111 and similar devices such as graphics processor 107. In one embodiment, memory hub 105 may be a 'North Bridge' chipset or similar device.

In one embodiment, system memory 109 may be a random access memory (RAM) module or set of modules. In one embodiment, system memory 109 may be composed of synchronized dynamic random access memory (SDRAM), double data rate (DDR) RAM or similar memory storage devices. System memory 109 may be used by computer system 101 to store application data, configuration data and similar data. System memory 109 may be volatile memory that loses data when computer system 101 powers down.

In one embodiment, other devices may be connected to memory hub 105 such as a graphics processor 107. Graphics processor 107 may be located directly on the mainboard. In another embodiment, graphics processor 107 may be located on a separate board attached to the mainboard through an interconnect or port. For example, graphics processor 107 may be located on a peripheral card attached to the mainboard through an accelerated graphics port (AGP) slot or similar connection. A graphics card or graphics processor 107 may be connected to a display device 123. In one embodiment, display device 123 may be a cathode ray tube (CRT) device, liquid crystal display (LCD), plasma device or similar display device.

In one embodiment, memory hub 105 may be in communication with an I/O hub 111. I/O hub 111 provides communication with a set of I/O devices and similar devices such as storage device 125, complementary metal oxide semiconductor (CMOS) device 113 or similar memory device, basic input-output system (BIOS) 115, universal serial bus (USB) controller 117, network device 119 and similar devices. In one embodiment, I/O hub 111 may be a 'South Bridge' chipset or similar device. In another embodiment, memory hub 105 and I/O hub 111 may be a single device.

In one embodiment, storage device 125 is a non-volatile storage device such as a fixed disk, physical drive, optical drive, magnetic drive or similar device. Storage device 125 may be used to store application data, operating system data and similar system data. In one embodiment, computer system 101 may include a removable media drive 129. A removable media drive may be a disk drive, CDROM drive, DVD drive or similar device. In one embodiment, CMOS 113 may store system configuration information, real time clock data (RTC), BIOS data and similar information. CMOS 113 may be a battery backed up memory device or similar non-volatile storage system. BIOS 115 manages system configuration and initialization. BIOS 115 default data may be stored in CMOS 113. In one embodiment, CMOS 113 and BIOS 115 are part of the same device.

In one embodiment, a USB controller 117 may be connected to I/O hub 111. USB controller 117 may be a type of microcontroller that manages a USB. In one embodiment, USB controller 117 may function as an input device controller serving as an interface between computer system 101 and USB input device 121. In an exemplary embodiment, USB controller 117 may manage a set of input devices that may include a mouse, printer, web cam and similar devices.

In one embodiment, other devices such as a network device 119 may be in communication with I/O Hub 111. Network device 119 may be a modem, network card, wireless device or similar device. In one embodiment, network device 119 may be integrated into the mainboard. In another embodiment, network device 119 may be a peripheral card connected to the mainboard through a Peripheral Component Interconnect (PCI), PCI Express slot or similar interconnect.

Figure 2:
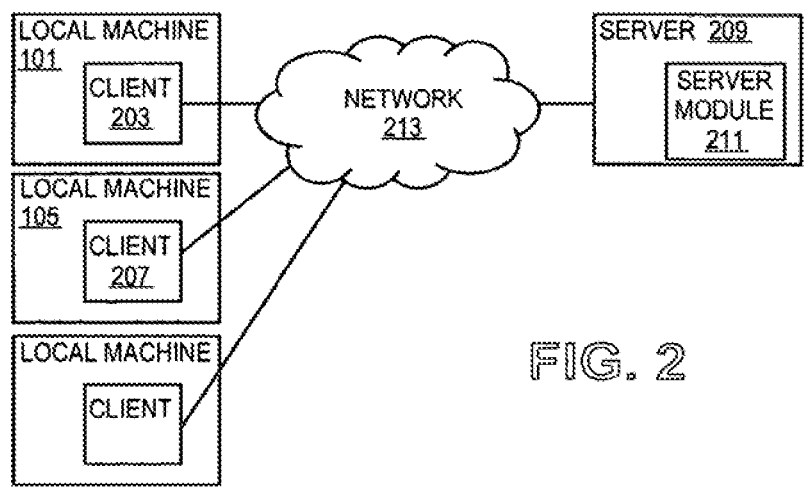
FIG. 2 is a diagram of one embodiment of a network including a computer system.

FIG. 2 is a diagram of one embodiment of a system including a remote system configuration updating mechanism. In one embodiment, computer system 101 may be a local machine that is connected to a network 213. As used herein, the term 'local machine' is a computer system with a system configuration manager to update the configuration of the computer system. A 'remote' machine or application is connected to the local machine through a network or similar mechanism. Computer system 101 may be a workstation, laptop, desktop or similar computer system. Computer system 101 may be connected to network 213 through network device 119. Network 213 may be a local area network (LAN), wide area network (WAN), the Internet or similar network. As used herein, the term 'system configuration data' refers to user configurable settings and hardware settings of a computer system that are set by a system configuration manager such as BIOS 115. User configurable settings typically include operating system (OS), power management and other general settings. Hardware settings may include processor, memory, bus, graphics processor and similar speed and latency settings. Hardware settings may also include component capacities and similar configuration data.

In one embodiment, computer system 101 may contain a local client module 203. Local client module 203 may be a software application or a hardware device that communicates with server module 211. The operation of local client module 203 is described in further detail below. Local client module 203 may be stored in storage device 125, CMOS 113, removable media drive 129 or similar storage location.

In one embodiment, network 213 may be used to connect multiple computer systems together. Additional computer systems such as local machine 205 may also run a local client module 207 to communicate with server module 211. Server 209 may be connected to network 213 using a network device such as a network card, modem, wireless device or similar device. Server 209 may run a server module 211. Server module 211 may be an application that is utilized to generate and monitor system configuration data for the various local machines 101, 205 connected to network 213. In one embodiment, server 209 may be a dedicated system, desktop system, laptop system, handheld system or similar system for providing a management tool for the computer systems connected to network 213. In another embodiment, server 209 may be a shared system running other applications.

In one embodiment, server module 211 provides a graphical user interface (GUI) to allow a user to monitor and modify the system configurations of computers networked with server 209. In another embodiment, the interface provided by server module 211 may not be graphics-based, but rather text-based or another interface may be provided. Server module 211 may communicate with local client modules 203, 207 over network 213 to obtain configuration data for each machine and to send new or updated configuration information to the client modules 203, 207. The messages may be formatted in a manner appropriate for communicating system configuration data using any suitable communication protocol. In one embodiment, server module 211 similarly communicates and receives data from multiple client modules 203, 207. Server module 211 may send separate configuration messages to each client module 203, 207 or may broadcast configuration data to multiple client modules 203, 207.

Figure 3:
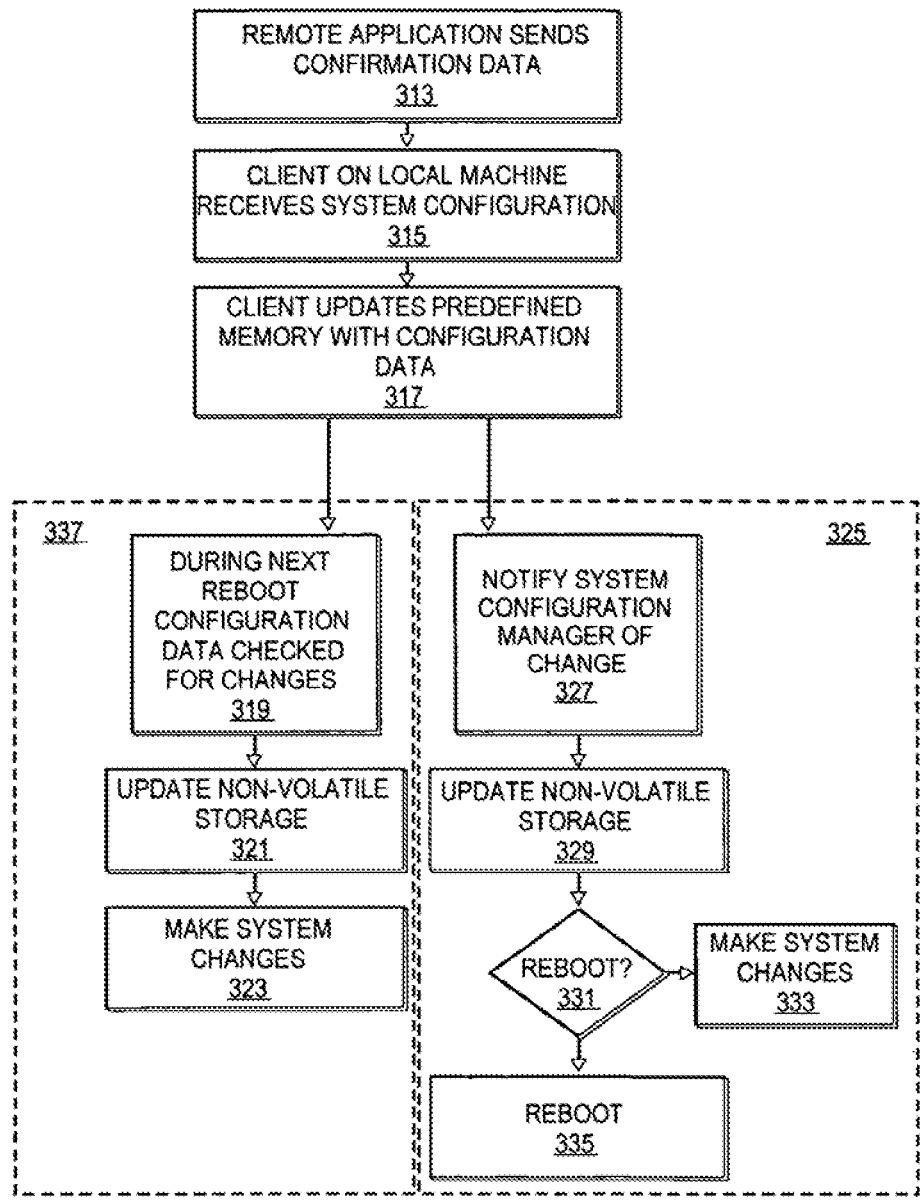
FIG. 3 is a flowchart of one embodiment of a process for remotely updating a system.

FIG. 3 is a flowchart of one embodiment of a process for remotely updating a system. In one embodiment, each computer system may have a default or local system configuration data that is used during the initialization of the computer. This default configuration may be updated at the machine by utilization of a system configuration manager such as BIOS 115 or a similar application. As used herein the term 'system configuration manager' refers to a program or module that manages the system configuration of a computer system locally. A BIOS may be an example of such a system configuration manager. The system configuration manager may be accessed during initialization of a computer system by the manual entry of a key sequence on the keyboard of the computer system. System settings that may be managed by the system configuration manager include device storage sizes, device speeds, CPU speed, system bus speeds, graphics settings, boot settings and similar system settings.

In one embodiment, a user may remotely access and alter system settings without manual input at the machine to be reconfigured. A user may utilize a server module 211 to view current system settings or to generate a new configuration for the target computer system. The server module 211 running on server 209 may send the configuration information over network 213 to a local machine 101 (block 313). For example, a system administrator may update the operating system software of local machine 101 either locally or remotely. The update of the operating system software may allow the utilization of larger fixed disk storage sizes than was supported by the operating system before the update. Local machine 101 may contain a fixed disk 125 that is larger than was supported by the operating system before the update. The system administrator may create a new system configuration for local machine 101 including an increased size for the fixed disk 125 to better utilize fixed disk 125. This new configuration may then be sent to local machine 101.

In one embodiment, a client module 203 running on the local machine 101 may receive the incoming configuration data from a network device 119 or similar method (block 315). In another embodiment, the configuration data may be applicable to multiple machines and may be broadcast to a set of machines on network 213. For example, client module 203 may receive the new configuration sent by the system administrator via server module 211 to enable the use of a larger space on fixed disk 125.

In one embodiment, client module 203 may write the received configuration data into a predefined memory space (block 317). The predefined memory space may be located in system memory 109, fixed storage device 125, removable media drive 129, CMOS or similar storage device. In another embodiment, a specialized memory device may be used to store the received system configuration data. In a further embodiment, system memory 109 or similar storage device may be modified or provided with a persistent power supply such as a battery back up to maintain the system configuration data during power down or reboot of computer system 101. For example, the new system configuration created by the system administrator may be written into system memory 109 or storage device 125. As used herein, the term 'reboot' refers to a restarting of a computer system. This restarting may or may not cause a loss of power to volatile memory and loss of data. As used herein the 'predefined memory area' refers to the storage area in any appropriate memory device or storage device or a combination of multiple devices where new or updated system configuration data may be stored before it is used to update the default configuration data.

In one embodiment, the received system configuration data may be written to the predefined memory area and stored in any appropriate format. In one embodiment, the format of the stored system configuration data may match the format of the default system configuration data stored in CMOS 113 or other location in computer system 101. As used herein 'default system configuration data' refers to system configuration data that may be stored in a non-volatile storage device such as CMOS 113 and used to initialize a computer system until new or updated system configuration data updates it. This default system configuration data may have been previously updated or changed. In a further embodiment, only changes to the current system configuration are transmitted by server module 211 and saved by client module 203.

In one embodiment, a passive updating scheme 337 may be used to update the system configuration with the received configuration data. In one embodiment, when a computer system 101 is rebooted or computer system 101 is powered on the system configuration manager may check to determine if changes to the system configuration are present (block 319). If there are changes present then the changes or new configuration may be used to modify or replace the default system configuration data stored by CMOS 113 or other appropriate storage device (block 321). For example, after a new or updated configuration is received from a system administrator and stored in the predefined memory area either the next time the system is rebooted or powered on then the system configuration manager examines the predefined memory space to determine if it contains new or changed configuration data. If new or updated data is found, then it may be copied into CMOS 113 to replace or modify the default system configuration data. In one embodiment, the detection of updated or new data involves a comparison of the default configuration data with the received system configuration data. In another embodiment, when the received system configuration data is stored by client module 203 a flag or similar indicator may be set. This indicator may be checked on reboot or power on to determine if new or updated data has been received.

In one embodiment, after CMOS 113 or similar storage device for the system configuration data is updated or replaced, the new default system configuration data is used to initialize or start up computer system 101 (block 323). In some circumstances this may require another reboot before the system configuration changes may be implemented. Changes to system configuration settings that are currently utilized or already initialized by the system configuration manager at the time of the updating of the system configuration setting may not be resettable while computer system 101 is running. For example, after copying the new configuration settings sent by the system administrator into CMOS 113, BIOS 115 may reboot the computer. During the subsequent reboot the new system configuration settings and data may be used.

In another embodiment, an active system 325 may be used to update system configuration settings. In one embodiment, after client module 203 has received and stored system configuration data from server module 211, it may notify the system configuration manager, such as BIOS 115, of the reception of updated or new configuration data (block 327). In one embodiment, a system configuration manager may examine the updated or new configuration data to determine if the change of configuration settings can be made while computer system 101 is running. In another embodiment, server module 211 may send an indication of whether the changes can be done while computer system 101 is running. In this case, the system configuration manager checks for this indication. For example, the system configuration update received by computer system 101 may be to adjust the size of fixed disk 125 to increase its recognized capacity. Server module 211 may determine that BIOS 115 and the operating system may be able to handle the dynamic change in capacity of fixed disk drive 125 and not require a reboot of computer system 101.

In one embodiment, after the system configuration manager is notified regarding the new or updated configuration data, it may copy the changes or new settings into the storage area for the default configuration settings such as CMOS 113 (block 329). A check may then be made to determine if the changes in the settings require a reboot of computer system 101 (block 331). This may be accomplished by checking for a direct indication from server module 211 or by analyzing the type of changes to the settings that were made. For example, BIOS 115 may implement the increase in recognized capacity of a fixed disk 125. It may then make a determination whether this configuration change requires a reboot of computer system 101 to completely implement the change without causing errors.

In one embodiment, if the changes to the system configuration do not require a reboot then the changes may be implemented and computer system 101 continues to function with the changes indicated by the new system configuration settings (block 333). If the changes to the system configuration require that the system be rebooted, then client module 203, system configuration manager, or the operating system may initiate a reboot of computer system 101 to complete the change in system configuration settings.

Figure 4:
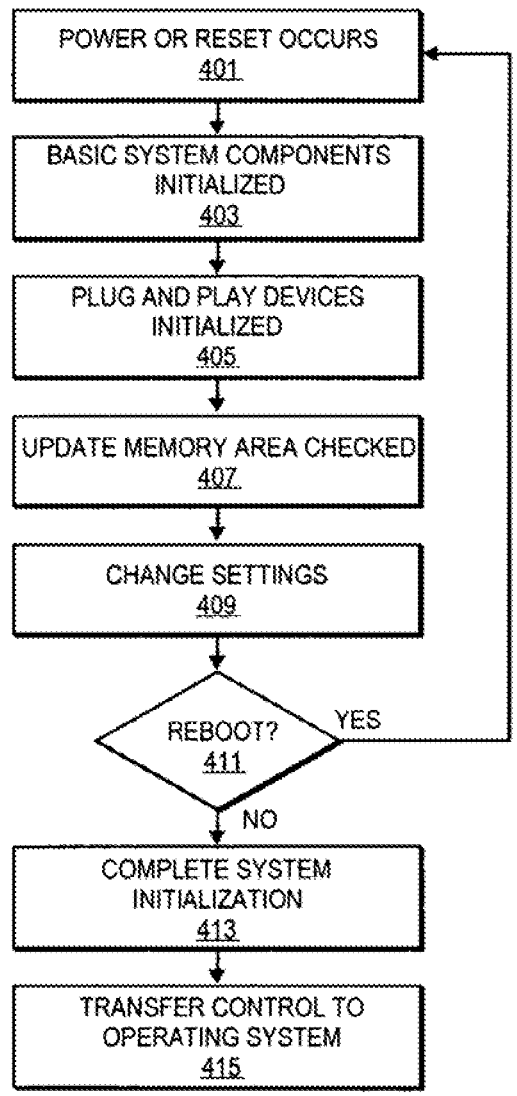
FIG. 4 is a flowchart of one embodiment of a process for performing a computer system initialization during start up or restart.

FIG. 4 is a flowchart of one embodiment of a process for performing a system initialization. In one embodiment, system initialization may occur when computer system 101 is powered on or reset (block 401). Computer system 101 begins execution of a system configuration manager which may start the initialization of basic system components (block 403). Basic system components may include the chipset, RTC and similar components. Initialization may continue by configuring all plug and play devices such as modems, graphics cards, network cards and similar peripheral cards and devices (block 405).

In one embodiment, a similar system configuration manager may check the predefined memory area to determine if the default system configuration needs to be updated (block 407). This may be determined through comparison between the default system configuration data and new or updated system configuration data or by detecting an update indicator. The system configuration manager may then begin the process of copying over or updating the default system configuration settings saved in CMOS 113 or similar non-volatile storage. The system configuration manager may then start to alter system settings in accordance with the changes indicated in the updated or new configuration data.

In one embodiment, the system configuration manager may determine whether it may be necessary to reboot computer system 101 (block 411). This may be determined by detecting a stored indicator requiring reboot or by analysis of the changes to the system settings in the new system configuration. If a reboot is necessary the reboot process may be restarted with the new configuration data having been stored in the default configuration space. If the reboot is not necessary, then the system configuration manager may continue and complete the initialization of the components of computer system 101 (block 413). When the initialization is complete, the system configuration manager may call a boot-load program to start up the appropriate operating system for computer system 101 (block 415). The operating system then takes primary control over computer system 101.

In one embodiment, server module 211 may send to client module 203 additional commands and information. Server module 211 may indicate whether the handling of configuration information is to be handled using an active method 325 or a passive method 337. Server module 211 may determine when or if the target computer system should reboot during a system reconfiguration process.

Figure 5:
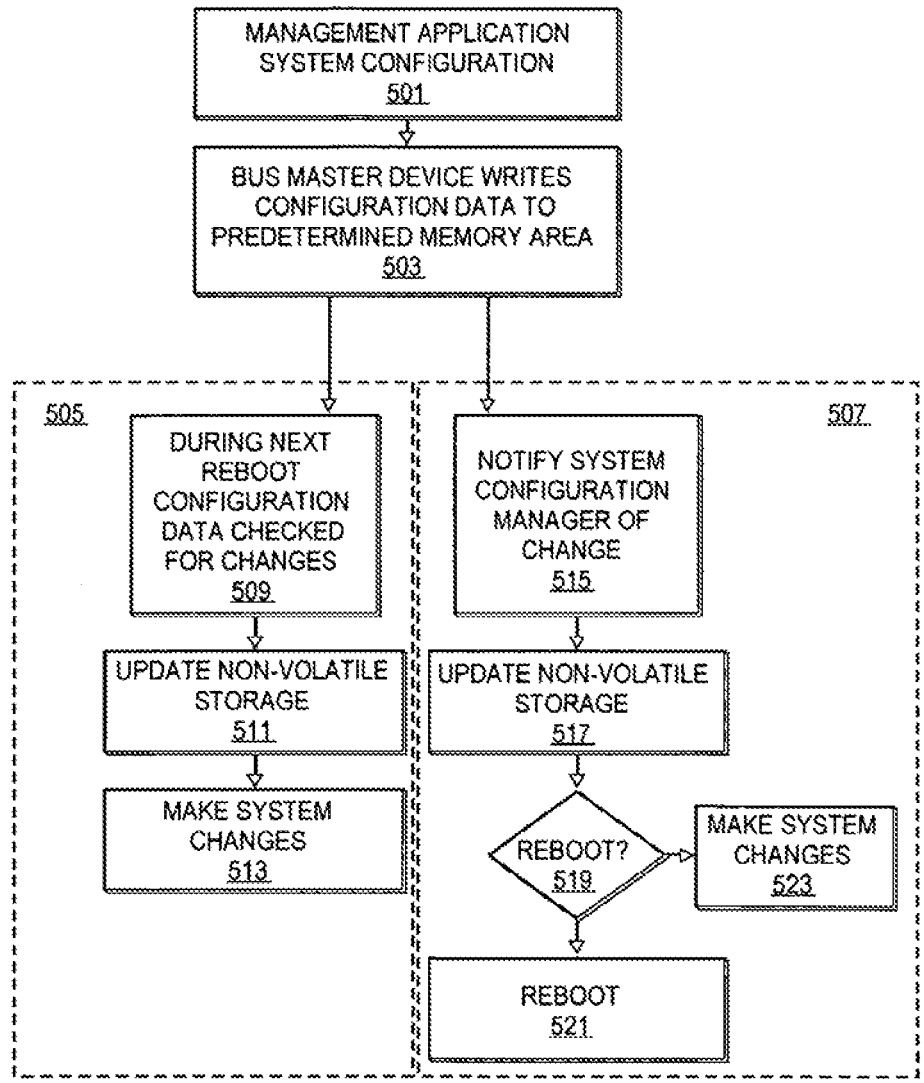
FIG. 5 is a flowchart of one embodiment of a process for performing a bus master update.

FIG. 5 is a flowchart of one embodiment of a process of performing a system configuration update utilizing a bus master device. As used herein, a 'bus master device' is any device that is capable of driving the internal bus of computer system 101. This enables the device to read and write to the memory space of computer system 101. A bus master device may be attached to computer system 101 as a USB device 121, serial device, wireless device, infra red device or similar device coupled to a USB port, serial port, parallel port, 1394 port (firewire) or similar port or connection device of computer system 101.

In one embodiment, the bus master device may be capable of interfacing with a system management application similar to server module 211. This system management application may be able to monitor the system configuration of a target computer system 101.

In one embodiment, the system management application may generate a system configuration and communicate this configuration to bus master device 121 (block 501). In one embodiment, bus master device 121 may be capable of storing the configuration. In another embodiment, bus master device 121 may retransmit the system configuration data by writing it to the predefined memory space (block 503). For example, a USB device with a memory module may be connected to a system configuration management application that loads a system configuration into the memory module of the USB device. The USB device may then be connected to a local machine 101 and the USB device may load the system configuration data from its internal memory module into the predefined memory space of local machine 101.

In one embodiment, bus master device 121 may support both a passive method 505 and an active method 507 of updating the system configuration of a target machine. In a passive method of updating the system configuration the update may occur during the next reboot or power on of computer system 101. During the reboot process the system configuration manager may check for updates to the system configuration (block 509). In one embodiment, the system configuration manager may make a comparison between the default system configuration stored in CMOS 113 or similar non-volatile storage and new system configuration data stored in the predefined memory space. In another embodiment, the system configuration manager may detect an indicator that changes or a new configuration is to be implemented.

In one embodiment, the system configuration manager will update the default system configuration data in CMOS or similar non-volatile storage with the new system configuration data during the start up or reboot (block 511). The system configuration manager may then implement the new configuration in computer system 101 (block 513). In another embodiment, the system configuration Manager may reboot computer system 101 to complete the implementation of the updated system configuration settings.

In one embodiment, an active update system 507 may be used. After the bus master has stored the new or updated system configuration data in the predefined memory space, the bus master may notify or provide an indicator to the system configuration manager that system configuration settings are to be changed (block 515). System configuration manager may then copy the new or updated configuration data from the predefined memory space to the default storage area such as CMOS 113 or similar non-volatile memory device or similarly update the default system configuration data (block 517).

In one embodiment, the system configuration manager may make a decision whether it is necessary to reboot to complete the implementation of the system settings (block 519). The system configuration manager may determine whether reboot is necessary by analyzing the types of system configuration changes that need to be made. In another embodiment, the system configuration manager may check for an indicator received from the bus master or stored by the bus master in a predefined location.

In one embodiment, a reboot may be necessary to complete the implementation of the updated or new system configuration settings. System configuration manager or operating system may initiate the reboot of the system and complete the implementation of the new default system settings during the start up sequence. In another embodiment, a reboot is not necessary to effect the changes to the system settings. The system configuration manager implements the updated or new configuration data stored in the default memory storage area and the operation of computer system continues.

In one embodiment, system configuration data may also be utilized by an advanced configuration and power management interface (ACPI) or similar interface. ACPI provides methods such as load and unload methods which facilitate the loading and unloading of definition blocks used to configure hardware devices in the computer system. In one embodiment, where a reboot of the system is not necessary to implement system configuration changes, ACPI definition blocks related to the system changes may be loaded or unloaded to implement modifications to the system configuration. This may include adding new methods in a definition block. These methods may be written in ACPI source language (ASL).

In one embodiment, the improved system configuration updating system may be implemented as software and stored on a machine readable medium. As used herein a machine readable medium may be a medium capable of storing or transmitting data and similar information such as a fixed disk, physical drive, CDROM, DVD, optical disk, wireless transmission, optical transmission, infra red transmission, and similar storage devices and transmission systems.

In the foregoing specification, the invention has been described with reference to specific embodiments thereof. It will, however, be evident that various modifications and changes can be made thereto without departing from the broader spirit and scope of the embodiments of the invention as set forth in the appended claims. The specification and drawings are, accordingly, to be regarded in an illustrative rather than a restrictive sense.

The invention claimed is:

1. A system, comprising:
a server computing device including logic to send at least a portion of an up-to-date version of a client system settings configuration and handling information to identify an active update or a passive update to a client computing device;
the client computing device including logic to
compare the at least portion of the up-to-date version of the client system settings configuration with a current version of the client system settings configuration being utilized on the client computing device;
determine whether the current version of the client system settings configuration needs to be updated;
determine whether a change on the current version of the client system settings can be made without rebooting the client computing device based at least in part on the handling information; and
update the current version of the client system settings configuration being utilized on the client computing device, based at least in part on the at least portion of the up-to-date version of the client system settings configuration received from the server computing device without rebooting the client computing device when said update can be made without rebooting the client computing device.

2. The system of claim 1, wherein the at least portion of the up-to-date version of the client system settings configuration is essentially equal to a set of differences in the up-to-date version of the client system settings configuration that are not present in the current client system settings configuration being utilized on the client computing device.

3. The system of claim 1, wherein the client computing device stores the received at least portion of the up-to-date version of the client system settings configuration locally for a period of time prior to performing the update to the current version of client system settings configuration being utilized on the client computing device.

4. The system of claim 1, wherein the client computing device comprises a mobile device capable of sending and receiving cellular telephony communications, the client computing device being communicatively coupled to the server computing device over a cellular network.

5. The system of claim 1, wherein the client computing device further comprises:
a non-volatile, rewriteable memory to store at least the current version of the client system settings configuration being utilized on the client computing device.

6. A client computing device, comprising:
a memory;
a processor coupled to the memory; and
logic operable on the processor to: retrieve an up-to-date version of a client system settings configuration and handling information to identify an active update or a passive update from a server computing device;
determine whether one or more settings in the up-to-date version of the client system settings configuration are modified from a corresponding one or more settings in a current version of the client system settings configuration being utilized on the client computing device; and
in response to at least one of the one or more settings in the up-to-date version of the client system settings configuration being modified, update the current version of the client system settings configuration being utilized on the client computing device according to the handling information and the at least one of the one or more modified settings in the up-to-date version of the client system settings configuration without rebooting the client computing device when said update can be made without rebooting the client computing device.

7. The client computing device of claim 6, wherein the client computing device communicates with the server computing devices over a cellular network.

8. The client computing device of claim 6, wherein the client computing device comprises a mobile device capable of sending and receiving cellular telephony communications, the client computing device being communicatively coupled to the server computing device over a cellular network.

9. The client computing device of claim 6, wherein the up-to-date version of the client system configuration is stored in a non-volatile, rewriteable memory, and the current version of client system configuration being utilized on the client computing device is updated to the up-to-date version of the client system configuration during a reboot of the client computing device.

10. The client computing device of claim 6, wherein the logic is configured to determine whether the one or more settings in the up-to-date version of the client system settings configuration are modified from the corresponding one or more settings in the current version of the client system settings configuration being utilized in the client computing device, during a reboot of the client computing device.

11. The client computing device of claim 6, wherein the client computing device determines whether said update can be made without rebooting the client computing device based at least in part on an indication, received from the server device, indicating whether said update can be made without rebooting the client computing device.

12. The client computing device of claim 6, wherein the client computing device reboots before updating the current version of the client system settings configuration based at least in part on an indication, received from the server device, indicating whether said update can be made without rebooting the client computing device.

13. The system of claim 1, wherein the server computing device further includes logic to send an indication of whether the change on the current version of the client system settings can be made without rebooting the client computing device.

14. The system of claim 13, wherein the client computing device determines whether to update the current version of the client system settings without rebooting the client computing device based at least in part on the indication received from the server computing device.

15. The system of claim 13, wherein the client computing device reboots before updating the current version of the client system settings configuration based at least in part on the indication received from the server computing device.

* * * * *